United States Patent
Leung et al.

(10) Patent No.: US 10,071,907 B2
(45) Date of Patent: Sep. 11, 2018

(54) BILAYER DYE SENSITIZED SOLAR CELL AND FABRICATION METHOD THEREOF

(75) Inventors: Wallace Woon-fong Leung, Hong Kong (HK); Lijun Yang, Hong Kong (HK)

(73) Assignee: THE HONG KONG POLYTECHNIC UNIVERSITY, Hung Hom, Kowloon (HK)

(*) Notice: Subject to any disclaimer, the term of this patent is extended or adjusted under 35 U.S.C. 154(b) by 405 days.

(21) Appl. No.: 13/244,957

(22) Filed: Sep. 26, 2011

(65) Prior Publication Data

US 2013/0074913 A1    Mar. 28, 2013

(51) Int. Cl.
| | |
|---|---|
| *H01G 9/20* | (2006.01) |
| *H01L 31/0352* | (2006.01) |
| *B82Y 20/00* | (2011.01) |
| *B82Y 30/00* | (2011.01) |

(52) U.S. Cl.
CPC ............ *B82Y 20/00* (2013.01); *H01G 9/2072* (2013.01); *B82Y 30/00* (2013.01); *H01G 9/2013* (2013.01); *H01G 9/2031* (2013.01); *H01G 9/2059* (2013.01); *Y02E 10/542* (2013.01); *Y02P 70/521* (2015.11)

(58) Field of Classification Search
CPC ...... H01G 9/20; H01G 9/2027; H01G 9/2063; H01G 9/2068; H01G 9/2072; H01G 9/2086; H01G 9/209; H01G 9/204; H01G 9/2031; H01G 9/2036
USPC ................... 136/244, 255–256, 263
See application file for complete search history.

(56) References Cited

U.S. PATENT DOCUMENTS

| | | | |
|---|---|---|---|
| 7,396,580 B2 | 7/2008 | Kawashima et al. | |
| 7,718,091 B2 | 5/2010 | Zijp et al. | |
| 2005/0109385 A1* | 5/2005 | Kim | H01G 9/2031 136/252 |
| 2007/0102676 A1* | 5/2007 | Lee | H01G 9/2031 252/500 |
| 2007/0209696 A1* | 9/2007 | Duerr et al. | 136/252 |
| 2009/0056808 A1* | 3/2009 | Jo | H01G 9/2031 136/261 |
| 2010/0221863 A1 | 9/2010 | Kim et al. | |

(Continued)

OTHER PUBLICATIONS

Bellat, A multi-step mechanism and integrity of titanate nanoribbons, 2015, Dalton Trans, 44, 1150-1160.*

(Continued)

*Primary Examiner* — Jeffrey T. Barton
*Assistant Examiner* — Andrew J Golden
(74) *Attorney, Agent, or Firm* — Barlow, Josephs & Holmes, Ltd.

(57) ABSTRACT

A photovoltaic cell comprises a first electrode that includes a first transparent conductive substrate, a first layer having a plurality of first semiconductor nanofibers, and a second layer having a plurality of second semiconductor super-fine fibers, the first semiconductor nanofibers having an average diameter smaller than an average diameter of the second semiconductor super-fine fibers, a light absorbing material adsorbed to at least some of the first semiconductor nanofibers and second semiconductor super-fine fibers, a second electrode includes a second transparent conductive substrate, and electrolytes dispersed in the first and second layers.

9 Claims, 6 Drawing Sheets

(56) References Cited

U.S. PATENT DOCUMENTS

2011/0079275 A1    4/2011    Qiao et al.

OTHER PUBLICATIONS

Brian O'Regan; Michael Gratzel. A low-cost, high-efficiency solar cell based on dye-sensitized colloidal TiO2 films. Nature 1991, 353, 737-9.
M. Gratzel. Solar Energy Conversion by Dye-Sensitized Photovoltaic Cells. Inorg. Chem. 2005, 44, 6841-6851.
Qingqing Miao; Liqiong Wu; Jingnan Cui; Mingdong Huang; Tingli Ma. A New Type of Dye-Sensitized Solar Cell with a Multilayered Photoanode Prepared by a Film-Transfer Technique. Adv. Mater. 2011DOI: 10.1002/adma.201100820.
Chan-How Yip; Yet-Ming Chiang; Chee-Cheong Wong. Dielectric Band Edge Enhancement of Energy Conversion Efficiency in Photonic Crystal Dye-Sensitized Solar Cell. J. Phys. Chem. C. 2008, 112, 8735-8740.
Halaoui, L. I.; Abrams, N. M.; Mallouk, T. E. Increasing the Conversion Efficiency of Dye-Sensitized TiO2 Photoelectrochemical Cells by Coupling to Photonic Crystals. J. Phys. Chem. B. 2005,109, 6334-6342.
Sarmimala Hore; Carmen Vetter; Rainer Kem,Herman Smit; Andreas Hinsch. Influence of scattering layers on efficiency of dye-sensitized solar cells. Solar Energy Materials & Solar Cells. 2006, 90, 1176-1188.
S. Hore; P. Nitz; C. Vetter; C. Prahl; M. Niggemann; R. Kern. Scattering spherical voids in nanocrystalline TiO2—enhancement of efficiency in dye-sensitized solar cells. Chem Commun. 2005, 15, 2011-2013.
Hyung-Jun Koo; Yong Joo Kim; Yoon Hee Lee; Wan in Lee; Kyungkon Kim; Nam-Gyu Park. Nano-embossed Hollow Spherical TiO2 as Bifunctional Material for High-Efficiency Dye-Sensitized Solar Cells. Adv. Mater. 2008, 20, 195-199.
H. Alarcon; G. Boschloo; P. Mendoza; J.L. Solis; A. Hagfeldt. Dye-Sensitized Solar Cells Based on Nanocrystalline TiO2 Films Surface Treated with Al3+ Ions: Photovoltage and Electron Transport Studies. J. Phys. Chem. B. 2005, 109, 18483-18490.
Ping Cheng; Changsheng Deng; Xiaming Dai; Bing Li; Danian Liu; Jingming Xu. Enhanced energy conversion efficiency of TiO2 electrode modified with WO3 in dye-sensitized solar cells. J. Photochem. Photobiol. A. 2008, 195, 144-150.
N.-G. Park; G. Schlichthorl; J. Van De Lagemaat; H. M. Cheong; A. Macsarenhas; A. J. Frank. Dye-Sensitized TiO2 Solar Cells: Structural and Photoelectrochemical Characterization of Nanocrystalline Electrodes Formed from the Hydrolysis of TiCl4. J. Phys. Chem. B. 1999, 103, 3308-3314.
Oomman K.; Varghese; Maggie Paulose; Craig A. Grimes. Long vertically aligned titania nanotubes on transparent conducting oxide for highly efficient solar cells. Naturenanotechnology. 2009, 4, 592-597.
M. Law; L. E. Greene; J. C. Johnson; R. Saykally; P. Yang. Nanowire dye-sensitized solar cells. Nat. Mater. 2005, 4, 455-459.
Seung Hwan Ko; Daeho Lee; Hyun Wook Kang; Koo Hyun Nam; Joon Yeob Yeo; Suk Joon Hong; et al. Nanoforest of Hydrothermally Grown Hierarchical ZnO Nanowires for a High Efficiency Dye-Sensitized Solar Cell. Nano Lett. 2011, 11, 666-671.
Xiangnan Dang, Hyunjung Yi, Moon-Ho Ham, Jifa Qi, Dong Soo Yun, Rebecca Ladewski, Michael S. Strano, Paula T. Hammond, Angela M.Belcher. Virus-templated self-assembled single-walled carbon nanotubes for highly efficient electron collection in photovoltaic devices. Naturenanotechnology, 2011 DOI: 10.1038/NNANO.2011.50.
Seigo Ito,Tetsuya Takeuchi, Terumasa Katayama, Masato Sugiyama, Mizuho Matsuda, Takayuki Kitamura, Yuji Wada,and Shozo Yanagida. Conductive and Transparent Multilayer Films for Low-Temperature-Sintered Mesoporous TiO2 Electrodes of Dye-Sensitized Solar Cells. Chem. Mater. 2003, 15, 2824-2828.
Surawut Chuangchote, Takashi Sagawa, and Susumu Yoshikawaa. Efficient dye-sensitized solar cells using electrospun TiO2 nanofibers as a light harvesting layer. Applied Physics Letters 93, 033310 (2008).
Zhipeng Tian,Hanmin Tian, Xiangyan Wang, Shikui Yuan, Jiyuan Zhang, Xiaobo Zhang, Tao Yu, and Zhigang Zou. Multilayer structure with gradual increasing porosity for dye-sensitized solar cells.

* cited by examiner

BILAYER DYE SENSITIZED SOLAR CELL AND FABRICATION METHOD THEREOF

BACKGROUND OF THE INVENTION

Field of the Invention

The present invention relates to dye-sensitized solar cells and fabrication method thereof, and particular, to dye-sensitized solar cells using more than one layer of semiconductor nanofibers as photoanode.

Description of the Related Art

The worldwide demand for energy is expected to double by the year 2050 and triple by the end of the century. Abundant supply of clean energy is necessary for global political, economical and environmental stability. The development of carbon-free source of sustainable renewable energy is one of the major challenges for scientists this century, including wind power, atomic energy and solar energy. Photovoltaic cells utilize practically inexhaustible solar energy, and are environmentally friendly. Since the first selenium photovoltaic cell was developed in 1983, silicon based solar cells have drawn a great deal of interest, and the technologies have been efficiently developed. However, conventional solar cells are not economically available due to high fabrication cost. Moreover, there are some limitations in the practical application and improvement in the efficiency.

Dye-sensitized solar cell (DSSC) is a non-conventional photovoltaic technology that has attracted much attention due to its cost-effectiveness in harvesting solar energy with appealing properties such as flexibility, transparency, and adaptability in large-area devices. The operating principle of DSSC is illustrated in FIG. 1. Upon illumination, the dyes adsorbed onto the metal oxide semiconductor (usually $TiO_2$) are sensitized to the excited state (S*) by light absorption right at the interface and they dissociate readily to create an electron-hole pair, with electrons subsequently injected into the conduction band of the semiconductor while the holes, at least initially, remain on the sensitizers. The dye ground state (S) is then regenerated by electron donation from the redox system to the oxidized state of the sensitizer ($S^+$). The recuperation of redox system is realized by transporting holes to the counter electrode either in diffusion or hopping mechanism (depending on the transporting mediator). The whole process is finally completed by electron migration via the outer circuit and the device generates electric power from light without chemical transformation.

In early development, there seemed little scope for practical application of DSSC because the currents generated by sensitization of single crystal electrodes such as zinc oxide are very small because the dye is present only as a monolayer at the surface and light absorption is therefore very weak. Until in 1991 O'Regan and Gratzel published a remarkable report: 7% efficiency DSSC fabricated using a nanocrystalline titanium dioxide sensitized by a strongly absorbed ruthenium dye. Since then, efforts to optimize DSSC have resulted in cells with efficiencies above 11% (under extreme ideal situation), which has lasted for more than a decade. Considerable efforts have been performed with an attempt to further improve the performance of DSSC for successful commercialization. These include:

(1) increasing the light harvesting (nabs). There are numerous methods to increase the light harvesting, such as increase surface area of the semiconductor, develop new dyes and dyes mixture with strong and broad absorption spectrum, introduce photonic crystal or address a light-scattering layer on the top of the photoanode.

(2) improving the electron injection efficiency ($\eta_{inj}$) and collection efficiency ($\eta_{coll}$). Fast diffusion and low recombination can improve injection and collection efficiency. Various methods have been carried out to transfer electron with the titanium in preference to other decay channels, for example modified surface of $TiO_2$ with insulating oxides or high band gap semiconductors, post-treatment with aqueous $TiCl_4$ solution, or use functional nanostructured photoanodes like one-dimensional nanostructures (nanotubes, nanowires, nanofibers).

The most broadly researched DSSC photoanode is composed of a mesoporous metal oxide semiconductor (usually $TiO_2$) fabricated form sol-gel processed sintered nanoparticles (20 nm in diameter) and addition of light scattering layer (200-400 nm in diameter) coated on transparent conductive oxide, e.g. Fluorine-doped $SnO_2$ (FTO) glass. However, electron transport in nanoparticle based DSSC photoanode mainly rely on trap-limited diffusion process, a low mechanism that limits the efficiency of the device. One promising solution is to provide more direct pathway for electron transport by replacing the nanoparticle with one-dimensional nano-materials, such as nanofibers as photoanode. This would help to reduce the recombination of the electron-hole pair and at the same time improve the transport of electron to the conducting glass and thereafter to the external circuit. In conjunction, it is important to find an effective media to better reflect the light and use the trapped light for further energizing the dye in the energy-harvesting layer of the photoanode. In the past, the selection of the energy harvesting layer and the reflector layer are unrelated and often this also results in poor performance (in efficiency) and much higher fabrication costs as it is at least a 2-step process.

In view of the conventional dye-sensitized solar cells, there still exists a need for high efficiency solar cells that are both simple to make and cost effective.

SUMMARY OF THE INVENTION

According to one aspect, the present invention provides a photovoltaic cell comprises a first electrode that includes a first transparent conductive substrate, a first layer having a plurality of first semiconductor nanofibers, and a second layer having a plurality of second semiconductor super-fine fibers, the first semiconductor nanofibers having an average diameter smaller than an average diameter of the second semiconductor super-fine fibers, a light absorbing material adsorbed to at least some of the first semiconductor nanofibers and second semiconductor super-fine fibers, a second electrode includes a second transparent conductive substrate, and electrolytes dispersed in the first and second layers.

According to another aspect, the present invention provides a method for making a photovoltaic cell of claim 1, the method comprises dispersing a first layer of semiconductor nanofibers on a transparent conductive substrate, the semiconductor nanofibers of the first layer having a first average diameter, dispersing a second layer of semiconductor super-fine fibers on the first layer of semiconductor nanofibers, the semiconductor super-fine fibers of the second layer having a second average diameter, wherein the first average diameter is smaller than the second average diameter, sensitizing the first and second layer of semiconductor nanofibers with a light absorbing material, and filling the first and second layer with electrolytes.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

The present invention provides a high efficiency DSSC using two layers of semiconductor super-fine fibers as photoanode. The fabrication of the DSSC is simple, fast, and cost effective.

Figure 1:
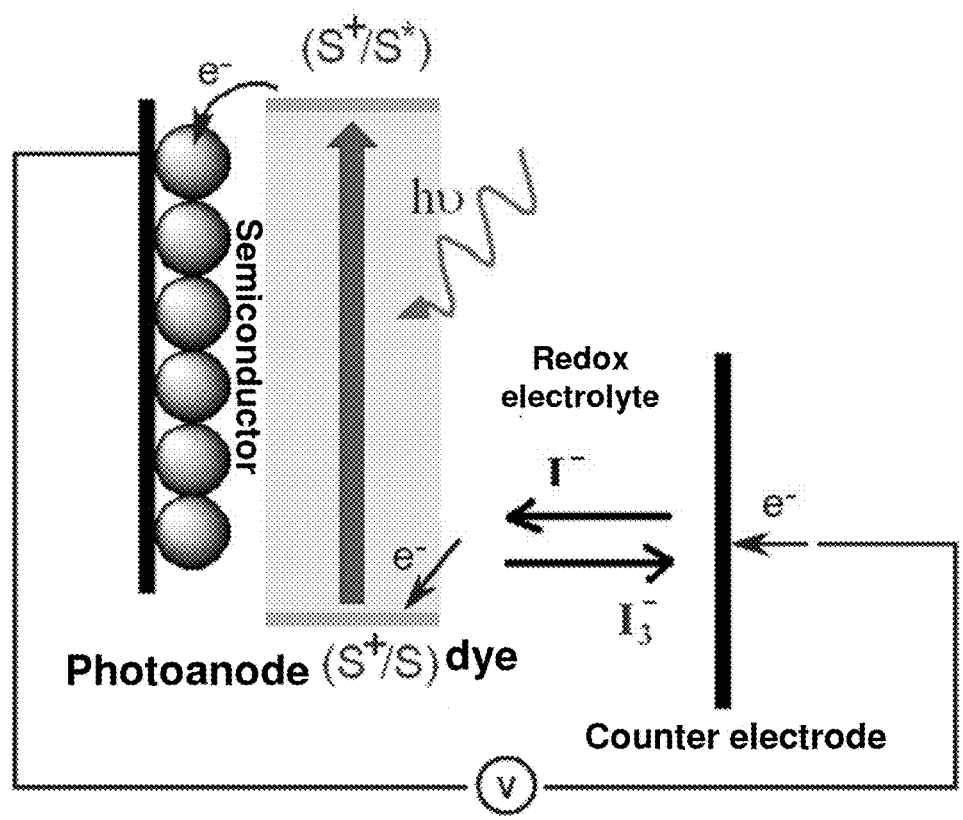
FIG. 1 illustrates the principle of operation of nanocrystalline $TiO_2$ dye-sensitized solar cells.
Figure 2:
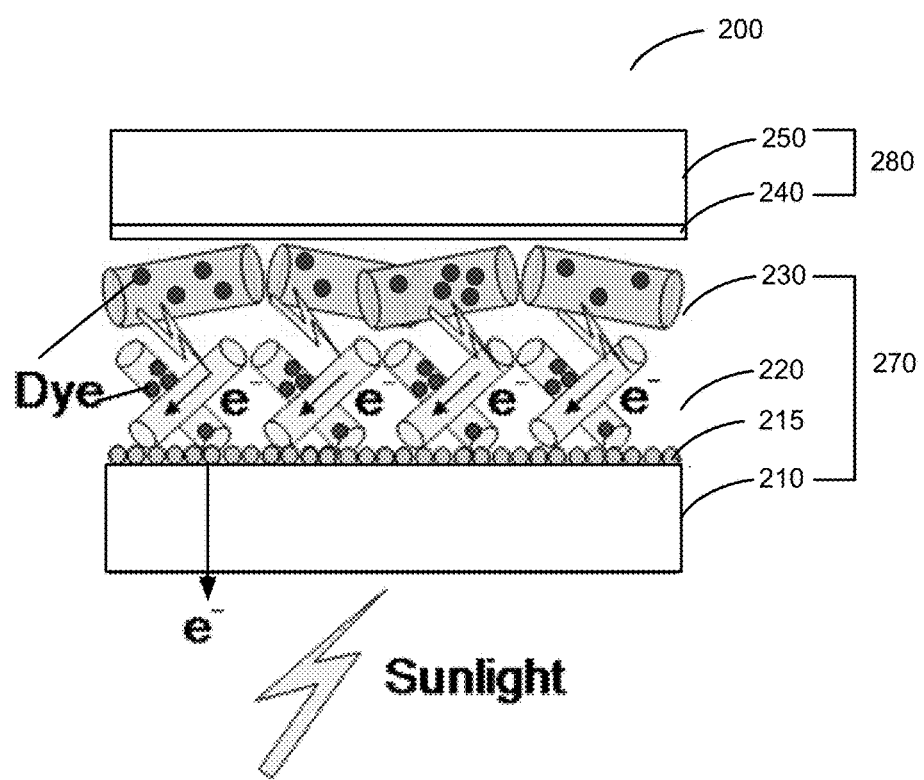
FIG. 2 illustrates a schematic of a bilayer semiconductor nanofiber DSSC in accordance with one embodiment of the present invention.

FIG. 2 illustrates a schematic of a bilayer semiconductor dye-sensitized solar cell (DSSC) in accordance with one embodiment of the present invention. Referring to FIG. 2, the DSSC 200 includes a semiconductor electrode 270 and a counter electrode 280. The semiconductor electrode 270 includes a transparent conductive substrate 210, a nanoparticle layer 215, a first nanofiber layer 220, and a second super-fine fiber layer 230. The counter electrode 280 includes a platinum layer 240, and a transparent conductive layer 250. In one embodiment, the first nanofiber layer 220 and second super-fine fiber layer 230 are made with titanium dioxide fibers, which are adsorbed with ruthenium based dye molecules. The void space of the first and second layers is filled with a mediator such as electrolyte (not shown). The electrolytes are adapted to transport electrons from the counter electrodes to the first and second layer to replenish the sensitized dyes. In one embodiment, the transparent conductive substrate 210 and 250 are fluorine-doped tin oxide (FTO) or indium tin oxide (ITO) glasses.

First, fabrication of the bilayer fibrous electrode can be performed by controlled processes (e.g. electrospinning, hydro-thermal processing, etc.) in one step. Thus, the production method is fast, simple and cost-effective. The fabrication process will be discussed in more details in connection with FIG. 3. Second, there is a specific relationship between the fiber diameter of the bilayer for, respectively, the energy harvesting layer and the reflector layer. The first nanofiber layer 220 with the smaller diameter nanofibers (SNF) in the photoanode has an average diameter nominally of 10-300 nm with a preferred average diameter of around 50-80 nm, while the second super-fine fiber layer 230 (reflector layer) with a bigger diameter nanofibers (BNF) or super-fine fibers that has an average diameter of 50 nm-2 microns with a preferred diameter around 80-120 nm. The SNF layer with high surface area is adapted to adsorb sufficient dye molecules and directly transport electrons reducing loss due to recombination.

The BNF layer primarily functions as a light scattering (light reflector) layer, ensuring adequate light is trapped in the device. Also, the BNF layer is also adapted to (a) harvest light as it also have dyes adsorbed onto the BNF, and (b) provide a permeable, porous, and well-connected structure for electrolytes (e.g. iodide ions $I^-$ and $I^-_3$) transport, carrying electrons from the counter electrode to regenerate the sensitized dyes in the SNF.

There is also a thin layer (e.g., a monolayer) of semiconductor nanoparticles 215 (e.g., $TiO_2$ nanoparticles), typically 5-20 nm, which is coated on the conductive glass 210 (i.e., ITO or FTO glass) for (i) providing good attachment (avoiding any cracks/gaps) of the SNF-BNF layers onto the conductive glass, and (ii) blocking any electrons in escaping through gaps/cracks which results in efficiency loss. In another embodiment, an adhesive may be used in lieu of the semiconductor nanoparticles.

Figure 3:
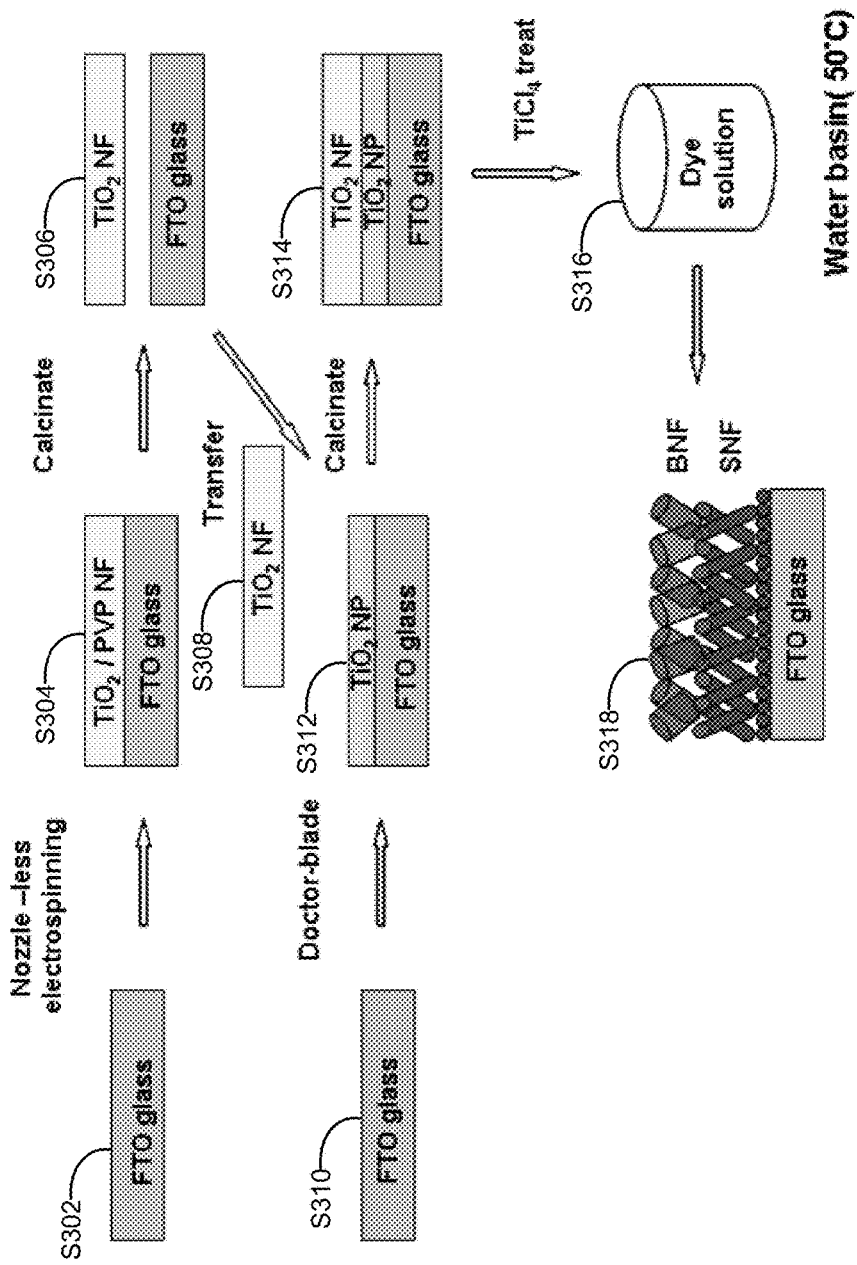
FIG. 3 illustrates an exemplary process for fabricating a bilayer semiconductor nanofiber photoanode.

FIG. 3 illustrates an exemplary process for fabricating a bilayer semiconductor nanofiber photoanode. To begin the fabrication process, a piece of FTO glass is prepared in S302. Next, in S304, a first layer of $TiO_2$/PVP composite nanofibers are electrospun on the FTO glass from a precursor solution which contains titanium isopropoxide (TIP, 1.2 g), polyvinyipyrrolidone (PVP, 1 g), acetic acid (1 g) and ethanol (30 mL). Other materials with good affinity to titanium dioxide such as polyvinylacetate, polyvinylalcohol, polyethyleneoxide and the like may also be used to prepare the precursor solution. After a first layer of nanofibers is dispersed on the FTO glass, a second layer of super-fine fibers with larger diameter is electrospun on the first layer of nanofibers to create a bilayer structure.

The diameter of the electrospun fibers can be influenced by processing parameters, and the diameter of the semiconductor ($TiO_2$) fibers is controlled by adjusting the composition of electrospinning solution, collector distance, and voltage. The electrospinning process is continued until the fibrous layer of a desired thickness is reached. For instance, a voltage of 70 Kv is first applied on an electrospinning apparatus over a collecting distance of approximately 19 cm, and after a predetermined amount of time, the voltage is changed to 55 Kv. By changing the voltage during the electrospinning process, two fibrous layers with different diameters can be fabricated. The thicknesses of the two layers are controlled by their respective electrospinning time.

Next, a calcination step is performed on the bilayer fiber in 450° C. for 2 h (S306). After calcination, the bilayer fiber is peeled off from the FTO glass due to shrinking effect and poor adhesion in step S308. Subsequently, another piece of FTO glass is prepared (S310) and a thin layer of $TiO_2$ nanoparticles is formed on the FTO glass by doctor blading in step (S312). Thereafter, the pilled bilayer semiconductor fiber is placed on top of the nanoparticles layer in which the nanoparticles layer serves as a hole-blocking layer as well as a bonding layer. Subsequently this new photoanode is calcinated at 450° C. for 2 h (S314). The calcinated photoanode is further treated with an aqueous solution of $TiCl_4$ (40 mM) at 60° C. for 15 min. Next, in step S316, the obtained bilayer $TiO_2$ photoanode is sensitized in a solution of 0.03 mM Ru dye (N719) solution in absolute ethanol at 50° C. for 24 h. The soaked photoanode is then washed with ethanol to remove unanchored dye molecules and then the photoanode is left dried (S318).

Platinum-sputtered FTO or conductive glass (not shown) is used as a counter electrode of the photoanode created in step. The counter electrode and dye anchored $TiO_2$ photoanode are assembled into a sandwich structure with Surlyn® (DuPont, 25 μm). An electrolyte is filled in the photoanode, which is composed of 0.6M 1-methyl-3-propylimidazolium iodide (PMII), 0.05 M LiI, 0.05 M $I_2$, and 0.5M 4-tert-butyl pyridine (TBP) in acetonitrile.

Figure 4A:
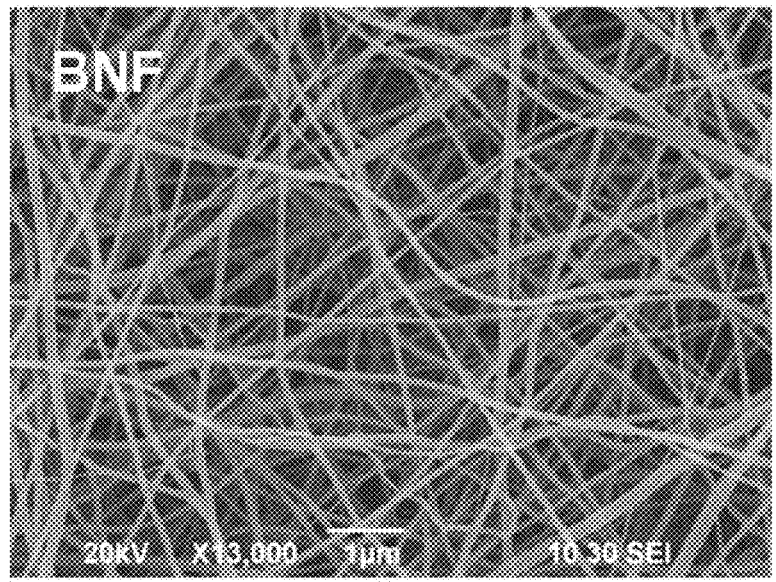
FIGS. 4A and 4B illustrate Scanning Electron Microscopy (SEM) images of the SNF and BNF layer.
Figure 4B:
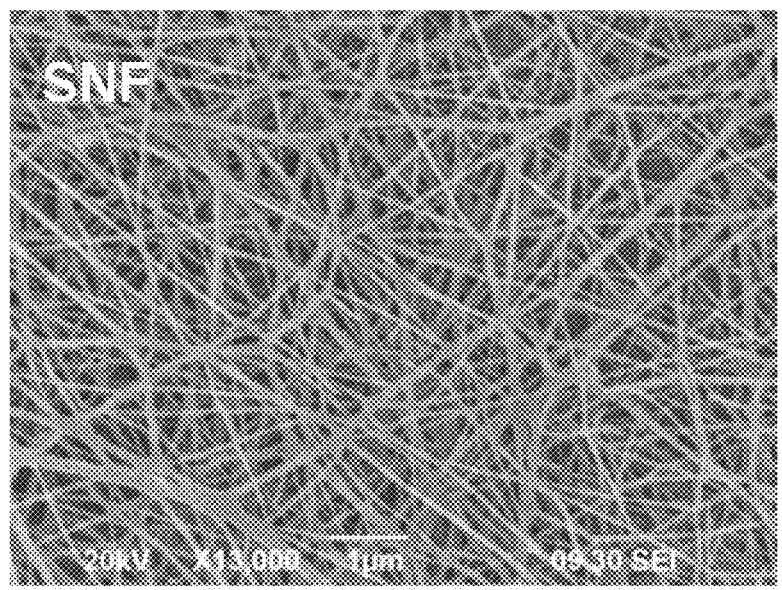

FIGS. 4A and 4B are the Scanning Electron Microscopy (SEM) images of SNF and BNF layer, respectively. From these SEM images, it can be seen that electrospun nanofibers are randomly distributed in the layer with an average diameter of about 60 nm and 100 nm respectively.

In a DSSC according to the present invention, the BNF layer acts as a light scattering layer which causes incident light on the light harvesting layer (i.e., SNF layer) to be sufficiently scattered, thus increase the optical path length in the DSSC device, and enhancing the light absorption in the device. As a result, by installing the light scattering layer (i.e., BNF layer) in the photoanode, the power conversion efficiency (PCE) of DSSC can be significantly improved to various levels above-and-beyond that of a single layer.

Figure 5:
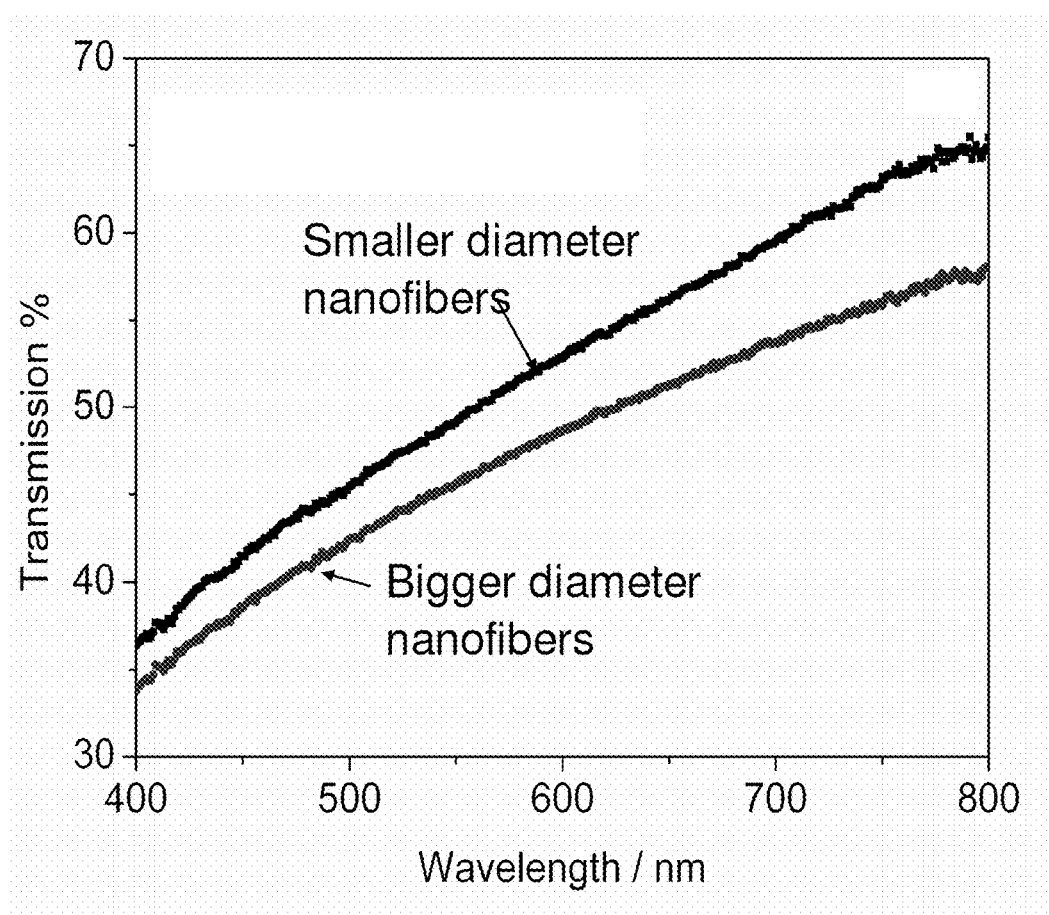
FIG. 5 illustrates a graph of UV-Visible transmission spectra of SNF and BNF layer having the same thickness.

FIG. 5 illustrates the UV-Visible transmission spectra of SNF and BNF layer with the same thickness. From UV-Visible transmission spectra, it can be seen that both of these layers show relatively high transmission (higher than 30%), and at the long wavelength range, the transmission higher than 50%. This transmission spectrum also shows that BNF scattering layer exhibiting lower transmission than that of the SNF layer at the wavelength range from 400 to 800 nm. This indicates more light is reflected in the BNF layer, and hence, there is less optical loss in the BNF layer which benefits from light harvesting.

Because the individual thickness of the respective SNF and BNF layers can be controlled simply by their electrospinning time, an object of the present invention is to monitor the ratio $r_t$ of the electrospinning time for the SNF to that of the BNF to obtain the optimal performance. This ratio of the electrospinning time $r_t$ can be held in constant while the combined thickness H is also monitored and can be changed accordingly. H is the combined thickness of the SNF layer $h_{SNF}$ and BNF layer $h_{BNF}$, i.e. $H=h_{SNF}+h_{BNF}$, where $h_{SNF}$ denotes the thickness of the SNF layer and $h_{BNF}$ denotes the thickness of the BNF layer.

In another embodiment, one can monitor the thickness ratio $r_h$, (i.e., the ratio of the thickness of BNF to that of the SNF) as used for non-electrospinning production of nanofibers for which formation time may not be conveniently measured. In conjunction with the above, the combined thickness H can also be monitored.

Figure 6:
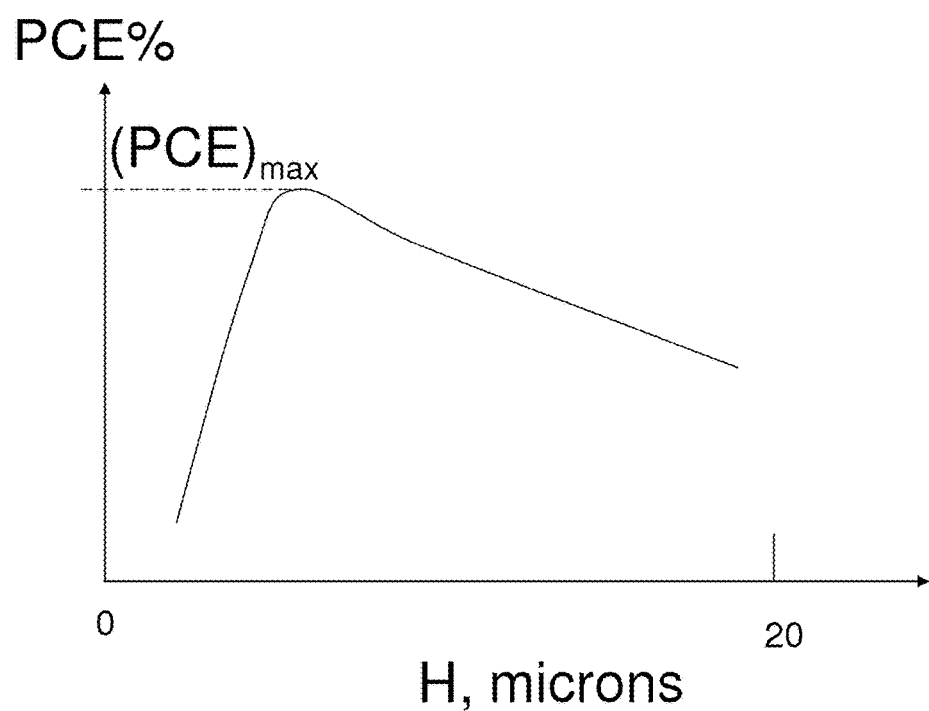
FIG. 6 illustrates a graph of power conversion efficiency versus combined thickness of photoanode for a constant $r_t$ or constant $r_h$.

FIG. 6 shows a graph of PCE as a function of H for a given ratio $r_t$ based on the electrospinning time. Similar curve can be drawn for constant ratio $r_h$ based on thickness. The behavior is typically an inverted concave behavior. At small thickness, PCE increases with thickness as there is increasing surfaces for dye to harvest solar energy, while at large thickness recombination rate becomes important and PCE reduces with further increase in thickness. There is a maximum efficiency for each ratio $r_t$ referred as PCE_max.

Example

In this example, a photoanode having a bilayer structure, with an average SNF diameter of 60 nm and an average BNF diameter of 100 nm, is produced using the method described above in connection with FIG. 3. The ratio of electrospinning time of SNF ($t_{SNF}$) to BNF ($t_{BNF}$) can be in the range of 1 to 20. Table 1 shows the maximum efficiency obtained for different $r_t$. As can be seen when $r_t$ varies between 2 and 5, the maximum efficiency rises above 8.4% with a preferred condition that at $r_t=5$, the PCE_max jumps to 9.5%. For reference, this should be compared to the performance of a single-layer of nanofiber photoanode with fiber diameter of 60 nm and with a total thickness between 8-12 microns, which is 7.14% obtained also from our study. When $r_t$ increases above 5, the reflector nanofiber layer becomes small and ineffective, and the PCE_max falls back to 6.8%. This is almost equivalent that of a single nanofiber layer at 7.14%. The ratio of the thickness between the small nanofibers to that of the bigger nanofibers can be between 1 and 20, and an ideal range between 4 and 5.

TABLE 1

| Bilayer Nanofiber Photoanode (H = 8-12 microns) | | | | | |
|---|---|---|---|---|---|
| $r_t = t_{SNF}/t_{BNF}$ | 2 | 3 | 4 | 5 | 6 |
| $r_h = h_{SNF}/h_{BNF}$ | 1-2 | 2-3 | 3-4 | 4-5 | 5-6 |
| PCE_max | 8.5% | 8.4% | 8.5% | 9.5% | 6.8% |

Table 2 compares the present invention with existing technologies that also utilize a reflector layer in the photoanode. Table 2 shows that our bilayer is much better than the one using nanoparticle-nanofiber (NP-NF) arrangement that was reported in "Efficient dye-sensitized solar cells using electrospun $TiO_2$ nanofibers as a light harvesting layer" by Yoshikawa et al. (2008) at 7.1% (34% improvement), as well as earlier result disclosed in "Influence of scattering layers on efficiency of dye-sensitized solar cells" by Hore et al. (2006) on nanoparticle-nanoparticle, which is 6.8%.

TABLE 2

| Comparing present invention with prior arts, H = 6-12 microns | | | |
|---|---|---|---|
| Photoanode with reflectance layer | NF-NF Bilayer (present invention) | NP-NF (Yoshikawa, 2008) | NP-NP (Hore, 2006) |
| PCE | 9.5% | 7.1% | 6.8% |
| % Improvement | 34% increase | 100% | / |
| % Improvement | 40% increase | / | 100% |

Also, another advantage is that the total layer thickness H of the present invention is usually less than 12 microns, predominantly 8-10 microns. This is much below that when nanoparticles are being used which increases up to 15-20 microns. In other words, a thinner layer (almost half as thick) means even lower cost in fabrication due to less materials being used.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:
1. A photovoltaic cell comprising:
   a first electrode includes:
      a first transparent conductive substrate, and
      a bilayer, nanofiber mat structure comprising
         a first light harvesting layer overlying said first transparent conductive substrate, said first light harvesting layer consisting of a plurality of randomly oriented first semiconductor nanofibers, and a second light scattering and light harvesting layer formed directly on said first light harvesting layer, said second light scattering and light harvesting layer consisting of a plurality of randomly oriented second semiconductor nanofibers said first and second layers of said bilayer mat structure being electrospun from the same material to form a unitary, interconnected mat structure having a total thickness (H) of 12 microns or less and wherein the ratio ($r_h$) of the thickness of the first layer to the second layer is no less than 1 and no more than 6, said plurality of nanofibers in said first layer having an average diameter of between 50 nm and 80 nm and said plurality of nanofibers in said second layer having an average diameter of between 80 nm and 120 nm;

a light absorbing material adsorbed to at least some of the first semiconductor nanofibers and second semiconductor nanofibers;

a second electrode includes a second transparent conductive substrate; and electrolytes dispersed in the first and second layers, wherein said bilayer, nanofiber mat structure forms a permeable, porous, and interconnected structure for electron transport within said cell.

2. The photovoltaic cell according to claim 1, wherein the first semiconductor nanofibers and the second semiconductor nanofibers are titanium dioxide fibers.

3. The photovoltaic cell according to claim 1, further includes a nanoparticle layer between the first transparent conductive substrate and the first layer, the nanoparticle layer includes a matrix of semiconductor nanoparticles.

4. The photovoltaic cell according to claim 3, wherein the semiconductor nanoparticles are titanium dioxide nanoparticles.

5. The photovoltaic cell according to claim 1, wherein the first transparent conductive substrate and the second transparent conductive substrate are indium tin oxide glass or fluorine-doped tin oxide glass.

6. The photovoltaic cell according to claim 1, wherein the first layer and the second layer have a thickness ratio (thickness of the first layer/thickness of second layer) of 4 to 5.

7. The photovoltaic cell according to claim 1, wherein the light absorbing material is ruthenium based dyes.

8. The photovoltaic cell according to claim 1, wherein the second electrode is a counter electrode.

9. The photovoltaic cell according to claim 3, wherein the first layer and the second layer have a thickness ratio (thickness of the first layer/thickness of second layer) of 4 to 5.

* * * * *